(12) United States Patent
Camp, Jr.

(10) Patent No.: US 9,590,715 B2
(45) Date of Patent: Mar. 7, 2017

(54) WCDMA POWER SAVING WITH TRANSMIT DIVERSITY

(75) Inventor: William O. Camp, Jr., Chapel Hill, NC (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 2685 days.

(21) Appl. No.: 11/615,281

(22) Filed: Dec. 22, 2006

(65) Prior Publication Data

US 2008/0151798 A1    Jun. 26, 2008

(51) Int. Cl.
| | |
|---|---|
| H04B 1/02 | (2006.01) |
| H04B 1/04 | (2006.01) |
| H04B 1/38 | (2015.01) |
| H04B 7/00 | (2006.01) |
| H04B 7/06 | (2006.01) |
| H04B 1/16 | (2006.01) |
| H04B 7/04 | (2006.01) |
| H04W 52/02 | (2009.01) |
| H04W 52/20 | (2009.01) |
| H04W 52/42 | (2009.01) |

(52) U.S. Cl.
CPC ......... *H04B 7/0693* (2013.01); *H04B 1/1615* (2013.01); *H04B 7/0404* (2013.01); *H04B 7/0691* (2013.01); *H04W 52/0232* (2013.01); *H04W 52/20* (2013.01); *H04W 52/42* (2013.01); *Y02B 60/50* (2013.01)

(58) Field of Classification Search
CPC .. H04W 72/0453; H04W 52/18; H04W 52/40
USPC .......... 455/101, 103, 127.1, 127.5, 574, 522
See application file for complete search history.

(56) References Cited

U.S. PATENT DOCUMENTS

| | | | |
|---|---|---|---|
| 6,173,005 B1 | 1/2001 | Kotzin et al. | |
| 6,330,433 B1* | 12/2001 | Jager | H04B 7/0808 455/135 |
| 6,564,069 B1* | 5/2003 | Ishida | 455/552.1 |
| 2001/0041537 A1* | 11/2001 | Simonsson et al. | 455/67.1 |
| 2002/0187753 A1* | 12/2002 | Kim et al. | 455/69 |
| 2003/0162511 A1* | 8/2003 | Kim | H04B 7/061 455/101 |

(Continued)

FOREIGN PATENT DOCUMENTS

| | | |
|---|---|---|
| EP | 1617570 A1 | 1/2006 |
| JP | 2001515295 A | 9/2001 |

(Continued)

OTHER PUBLICATIONS

The mobile communications handbook, Gibson, Jerry D, ISBN: 0849385970, Section 19.5.1 (c) 1999.*

(Continued)

*Primary Examiner* — Joshua Schwartz
(74) *Attorney, Agent, or Firm* — Coats & Bennett, PLLC

(57) ABSTRACT

A mobile terminal reduces its power consumption by selectively switching between a diversity mode and a non-diversity mode. The mobile terminal monitors the total output power of two or more of its transmitters, and selectively switches between the diversity mode and the non-diversity mode based on the total output power. The mobile terminal may also selectively switch between the diversity and non-diversity modes based on a difference in output power levels between the two or more transmitters.

8 Claims, 5 Drawing Sheets

(56) References Cited

U.S. PATENT DOCUMENTS

| | | | |
|---|---|---|---|
| 2004/0203451 A1* | 10/2004 | Braun et al. | 455/67.11 |
| 2004/0213187 A1* | 10/2004 | Fujil | 370/335 |
| 2004/0235433 A1* | 11/2004 | Hugl et al. | 455/101 |
| 2004/0264610 A1* | 12/2004 | Marro | H04R 3/00 375/347 |
| 2005/0136856 A1* | 6/2005 | Goldberg | H04B 7/0842 455/101 |
| 2006/0135079 A1 | 6/2006 | Barnett et al. | |
| 2006/0276227 A1 | 12/2006 | Dravida | |
| 2009/0175383 A1* | 7/2009 | Cho | H04B 7/0617 375/316 |

FOREIGN PATENT DOCUMENTS

| | | | | |
|---|---|---|---|---|
| JP | 2002176379 A | 6/2002 | | |
| JP | 2005244854 A | 9/2005 | | |
| JP | 2006180087 A | 7/2006 | | |
| WO | 00/11806 A1 | 3/2000 | | |
| WO | 02/07464 A1 | 1/2002 | | |
| WO | 2005/114853 A1 | 12/2005 | | |
| WO | WO 2006006770 A1 * | 1/2006 | | H04B 7/02 |

OTHER PUBLICATIONS

International Search Report mailed Jan. 3, 2008 in PCT/US2007/077076 filed Aug. 29, 2007.
Notice of Preliminary Rejection issued on Feb. 17, 2011 in re Korean Application No. 2009-7014844.

* cited by examiner

WCDMA POWER SAVING WITH TRANSMIT DIVERSITY

BACKGROUND

The present invention relates generally to mobile communication systems and, more particularly, to methods for reducing power consumption by mobile terminals in mobile communication systems.

A known problem with WCDMA phones is excessive power consumption that results in undesirable current drain and short battery life. When engaged in normal voice communications, a WCDMA phone transmits and receives continuously. This continuous operation is one of the primary reasons for the undesirable current drain in WCDMA phones. Another reason for current drain is the presence of a duplexer in the transmit path that increases path loss.

The total output power of the mobile terminal can be reduced by using transmit diversity. With transmit diversity, the mobile terminal transmits signals on the uplink using two or more transmitters, each connected to their own antennas. Because of the resulting diversity gain, the mobile terminal generally requires less total transmit power when it uses multiple transmitters/antennas than when it uses a single transmitter/antenna. Thus, a mobile terminal using transmit diversity is generally more efficient than a mobile terminal that does not use transmit diversity.

However, this is true only when the mobile terminal operates at a high total output power. The efficiency diminishes when the total output power is low. Typically, a transmitter amplifier current drain level will typically not drop below some minimum level, even when the total output power is decreased below zero (0) dBm. This minimum current drain level is referred to as the "current floor." When two transmitters are used for transmit diversity, this "current floor" is doubled. In this situation, the two transmitter amplifiers draw more current than a single amplifier.

SUMMARY OF THE INVENTION

The present invention provides a method of reducing power consumption by selectively enabling and disabling transmit diversity in a mobile terminal based on the output power level of the transmitter. In one exemplary embodiment, the mobile terminal monitors the total output power associated with two transmitters and selectively disables one of the transmitters when the total output power drops below a minimum threshold. Thus, at low total output power levels, the mobile terminal operates in a non-diversity mode using only a single transmitter. When the total output power exceeds the minimum threshold, however, the mobile terminal switches to a diversity mode by enabling two or more transmitters. Once in the desired mode, the mobile terminal may adjust the output power of one or both of its transmitters.

Switching to the diversity mode at high total output power levels permits the mobile terminal to take advantage of the diversity gain to reduce its power consumption. Switching to the non-diversity mode at low total output power levels avoids the current drain associated with maintaining multiple transmitters at a minimum output power level.

In another exemplary embodiment, where the output power level of two transmitters is independently power controlled, the mobile terminal monitors the output power levels of each transmitter. The mobile terminal compares the transmit power levels, and determines whether a difference between the two falls below some minimum threshold. If the difference in output power levels exceeds a maximum allowed difference, the mobile terminal switches to the non-diversity mode by disabling one of the transmitters. Conversely, if the difference in output power levels falls below the maximum allowed difference, the mobile terminal switches to the diversity mode by enabling both of the transmitters.

DETAILED DESCRIPTION

The present invention provides a method of reducing power consumption in a mobile terminal capable of operating in a diversity mode using multiple transmitters or in a non-diversity mode using only a single transmitter. Particularly, the mobile terminal monitors the total output power, and selectively switches between the diversity mode and the non-diversity mode based on the total output power. The mobile terminal may also selectively switch between the diversity and non-diversity modes based on a difference in output power levels between the two or more transmitters. Switching between the diversity and non-diversity modes permits the mobile terminal to benefit from diversity gain at high total output power levels, and avoid the current drain associated with maintaining the multiple transmitters at a minimum output power level.

The following description illustrates the present invention as it is applied to a voice channel in a WCDMA radio communication system; however, the techniques of the present invention may also be used to reduce power consumption in other radio communication systems and devices as well. Additionally, the techniques described herein may be applied to any type of information, such as audio, video, and other data.

Figure 1:
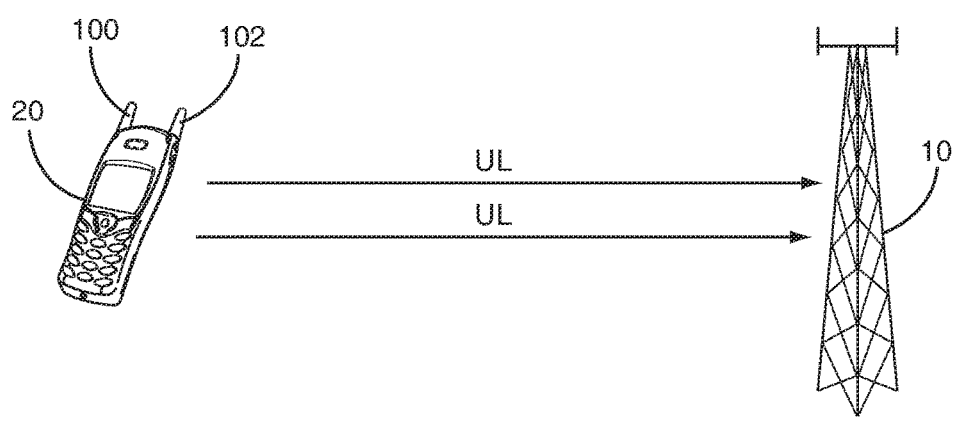
FIG. 1 is a schematic diagram of a communication system.

FIG. 1 illustrates a base station 10 and mobile terminal 20 in a WCDMA communication system. The mobile terminal 20 transmits voice and other signals to the base station 10 over one or more uplink (UL) channels. The mobile terminal 20 also receives voice and other signals from the base station over one or more downlink channels (not shown). In the exemplary embodiment shown in FIG. 1, the mobile terminal 20 includes two transmitters for transmit diversity, each connected to its own antenna 100, 102. When operating in diversity mode, the mobile terminal 20 transmits signals to the base station 10 over the uplinks using both transmitters/antennas. When operating in a non-diversity mode, the mobile terminal 20 transmits signals to the base station 10 using only a single transmitter/antenna. As described in more detail later, the mobile terminal 20 can selectively switch between the diversity mode and the non-diversity mode.

Transmit diversity results in diversity gain, which may be used to either improve signal quality or reduce the transmit power required to maintain a desired signal quality. Generally, the total transmit power required to transmit a signal from mobile terminal 20 to base station 10 with a given signal quality is lower when the mobile terminal 20 operates in the diversity mode than in the non-diversity mode. However, the transmitter amplifiers used by the mobile terminal 20 may not allow the current drain of the transmitters to drop below a minimum level, even when the transmitter output power is low. This minimum level, referred to as the "current floor," may result in an undesirably high current drain at low output power levels. When operating in a diversity mode, the current drain essentially doubles because there are two separate transmitter amplifiers.

According to the present invention, the mobile terminal switches between the diversity mode and the non-diversity mode based on the total output of the transmitters. Particularly, the mobile terminal 20 disables one of its transmitters at very low total output power levels and uses only a single transmitter to communicate with the base station in the non-diversity mode. At high total output power levels, the mobile terminal 20 enables both transmitters and communicates with the base station 10 in the diversity mode.

Figure 2:
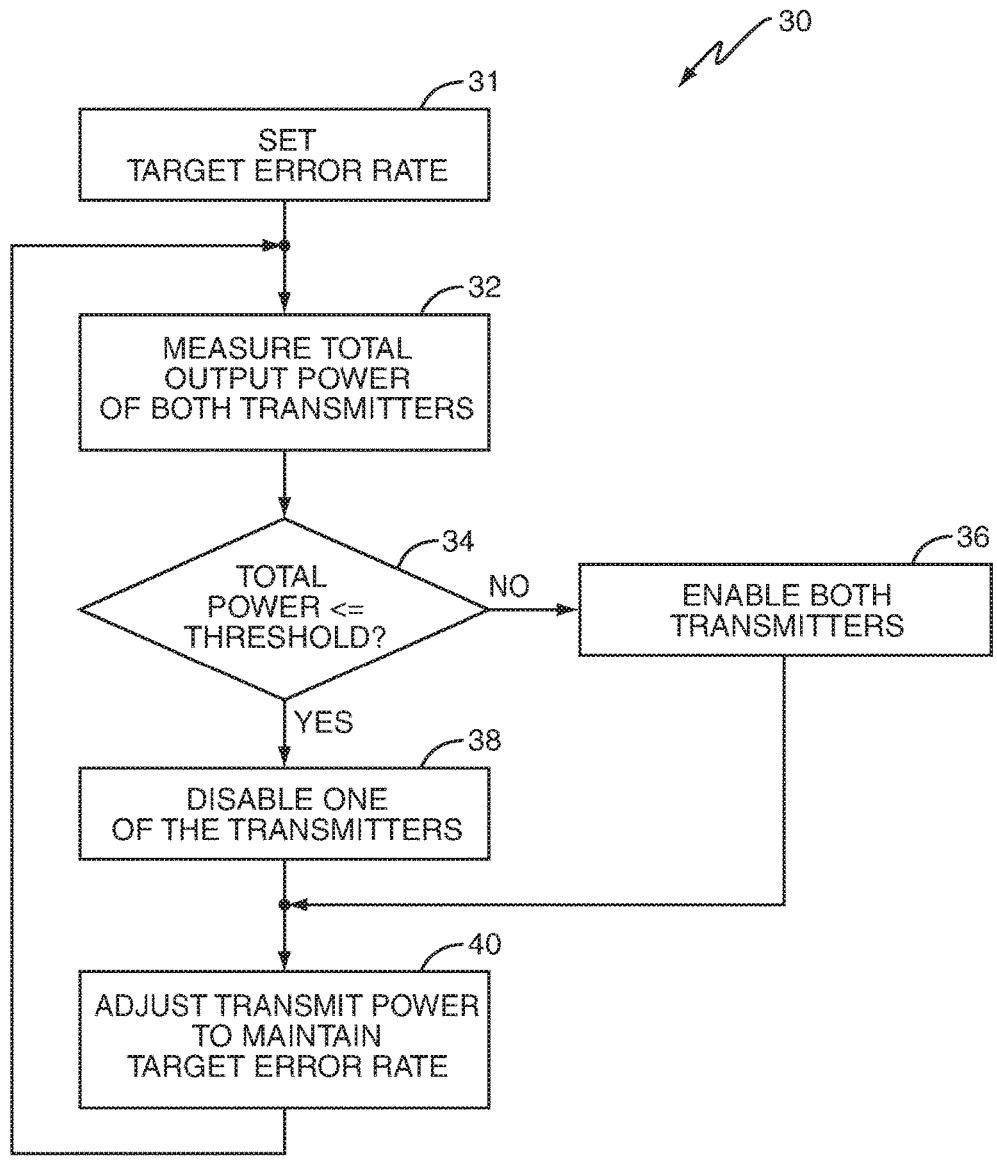
FIG. 2 is a flow chart illustrating a method implemented by a mobile terminal to selectively enable and disable transmit diversity.

FIG. 2 illustrates an exemplary method 30 implemented by a mobile terminal 20 for selectively enabling and disabling transmit diversity. Initially, the mobile terminal may set a target error rate (block 31). When the mobile terminal 20 is transmitting, the mobile terminal 20 measures the total output power of both transmitters (block 32). The mobile terminal 20 compares the total output power to a minimum threshold (block 34). If the current power level of the mobile terminal 20 is above the threshold, the mobile terminal 20 enables both transmitters (block 36). If the total output power of both transmitters is less than the minimum threshold, the mobile terminal 20 disables one of the transmitters (block 38). Once in the mobile terminal 20 is in the desired mode (i.e., diversity or non-diversity mode), the mobile terminal 20 may adjust the transmit power level to maintain the target error rate (block 40).

Allowing the mobile terminal 20 to adjust the transmit power permits the mobile terminal 20 to optimize the diversity gain benefits. As previously stated, the mobile terminal 20 generally requires less transmit output power when it switches to the diversity mode to maintain a desired signal quality or error rate. Therefore, the mobile terminal 20 can either "spend" the diversity gain benefits by reducing its transmit output power without exceeding the target error rate, or continue to transmit at the lower output powers and benefit from better signal quality.

The mobile terminal 20 may use any criteria known in the art to determine which transmitter to disable when switching to the non-diversity mode. In embodiments where the transmitters are independently power controlled, the mobile terminal 20 may disable the transmitter having the lowest output power level. In other embodiments, the mobile terminal 20 may estimate the channel conditions associated with each transmit antenna, and disable the transmitter corresponding to the antenna with the least favorable channel conditions. Once the selected transmitter is disabled, the mobile terminal 20 transmits signals on the uplink using the selected transmitter.

Figure 3:
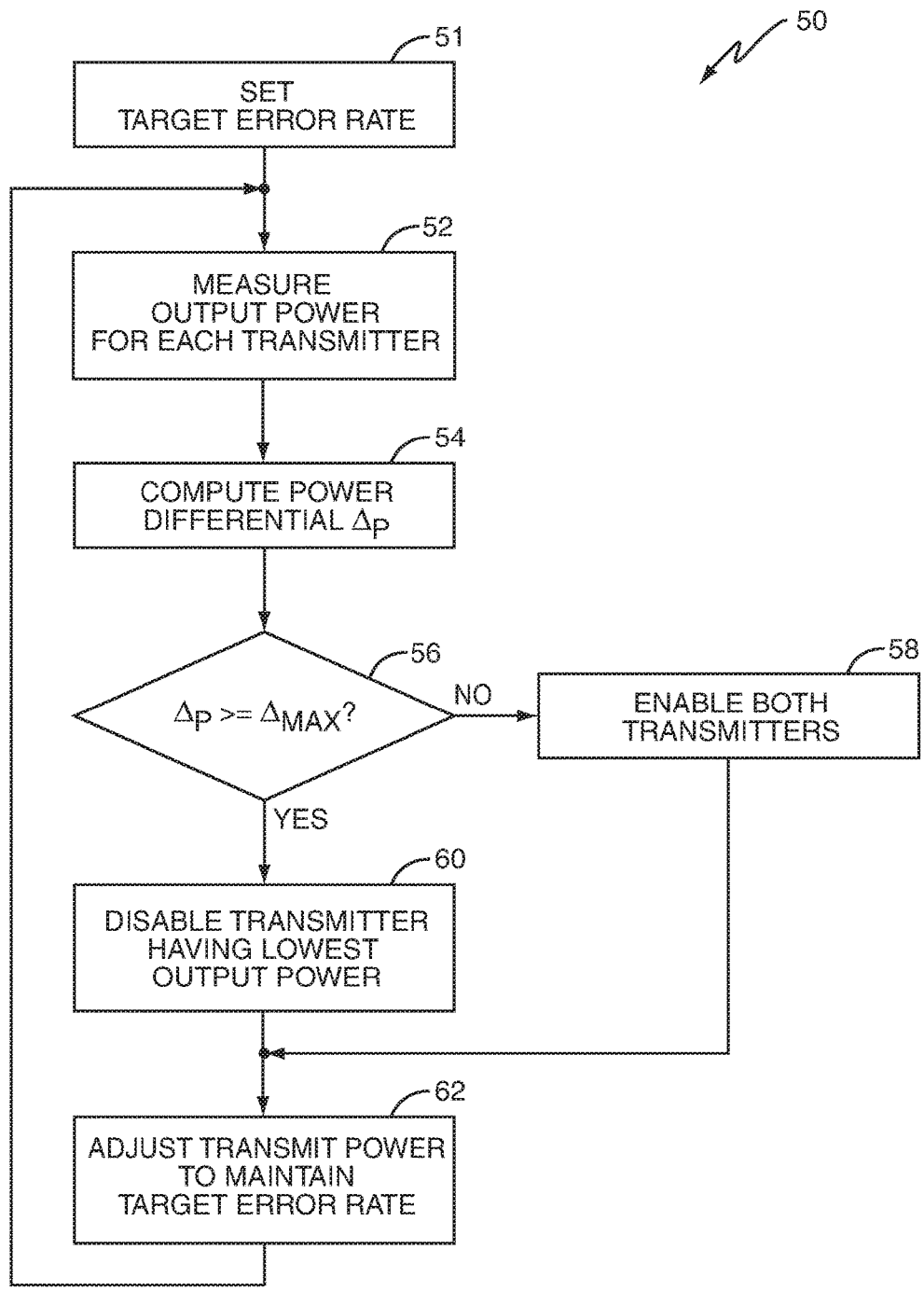
FIG. 3 is a flow chart illustrating an alternative method implemented at a mobile terminal to selectively enable and disable transmit diversity.

FIG. 3 illustrates an alternate method 50 implemented by the mobile terminal 20 to switch between diversity mode and non-diversity mode in which the mobile terminal transmitters are independently power controlled. In this embodiment, the mobile terminal 20 sets the target error rate for the receive path as a whole (block 51), measures the output power level for each transmitter (block 52), and computes the difference $\Delta_P$ in the output power levels of the transmitters (block 54). The difference $\Delta_P$ in the output power levels of the two transmitters is compared to a maximum difference $\Delta_{MAX}$ (block 56). If the computed difference $\Delta_P$ is less than $\Delta_{MAX}$, the mobile terminal 20 enables both transmitters (block 58). Otherwise, the mobile terminal disables the transmitter having the lowest output power level (block 60). Once the mobile terminal 20 is operating in the selected mode, the mobile terminal 20 may adjust the transmit output power of one or both of the transmitters to maintain the target error rate(s) as previously stated (block 62).

Figure 4:
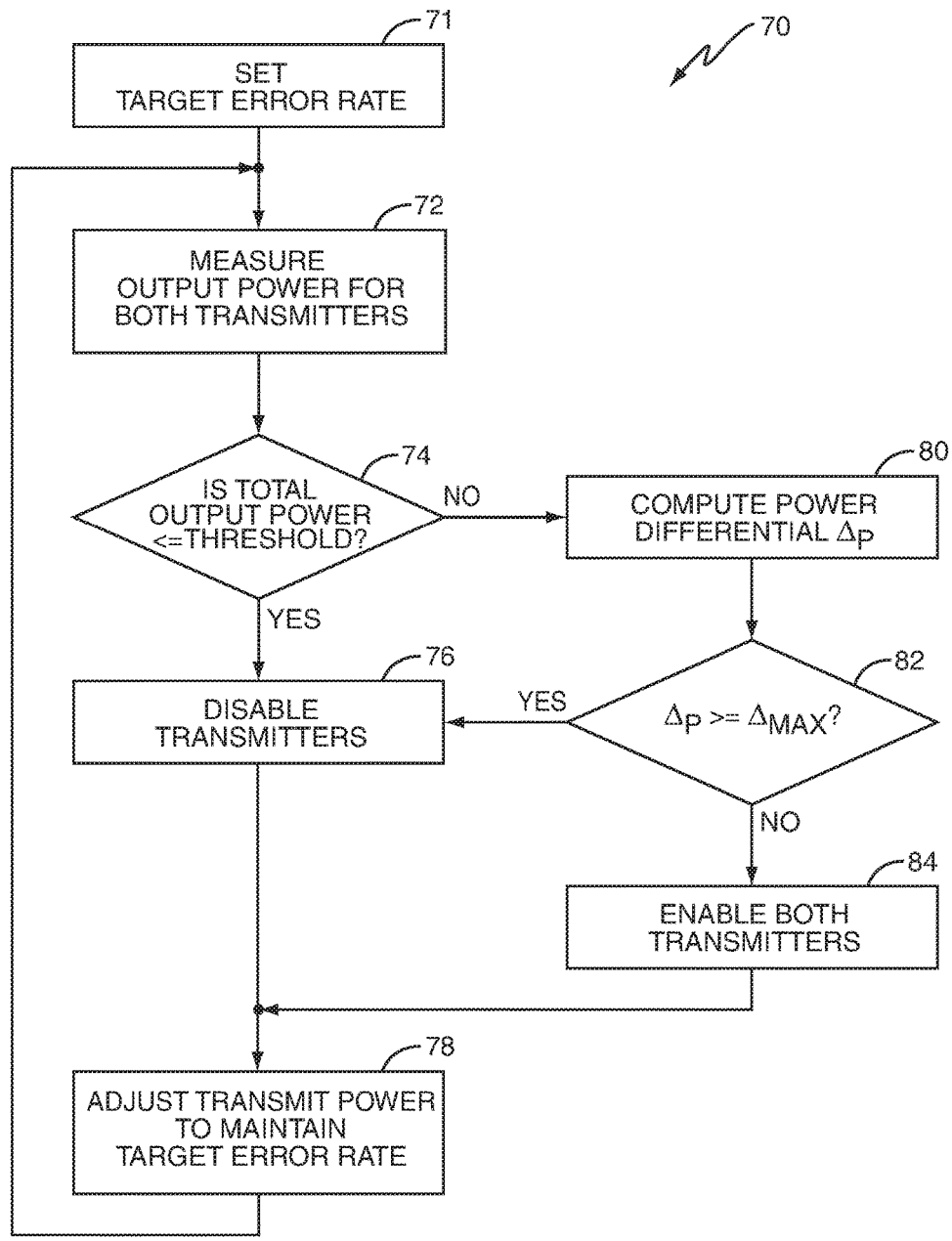
FIG. 4 is a flow chart illustrating a third exemplary method implemented by a mobile terminal for selectively enabling and disabling transmit diversity.

FIG. 4 illustrates a third method 70 that can be implemented by the mobile terminal 20 to selectively enable and disable transmit diversity. This embodiment combines elements of the methods 30 and 50 shown in FIGS. 2 and 3. In method 70, the mobile terminal 20 sets the target error rate (block 71) and measures the output power for both transmitters (block 72). The mobile terminal 20 computes the total output power level and compares the total output power level to a minimum threshold (block 74). If the total output power level of both transmitters is less than the minimum threshold, the mobile terminal 20 disables one of the transmitters (block 76).

As previously noted, the mobile terminal transmitters may be independently power controlled, and thus, permit the mobile terminal 20 to selectively disable the transmitter having the lowest output power level. Returning to block 74, if the combined output power is greater than the minimum threshold (block 74), the mobile terminal computes the difference $\Delta_P$ in the output power level of the two transmitters (block 80) and compares the difference $\Delta_P$ to a maximum allowed difference $\Delta_{MAX}$ (block 82). If the power difference $\Delta_P$ between the two transmitters exceeds $\Delta_{MAX}$, the mobile terminal 20 disables one of the transmitters (block 76). Otherwise, the mobile terminal 20 enables both transmitters (block 78). As above, the mobile terminal 20 may adjust the transmit power of the selected transmitter(s) to maintain the target error rate(s).

Figure 5:
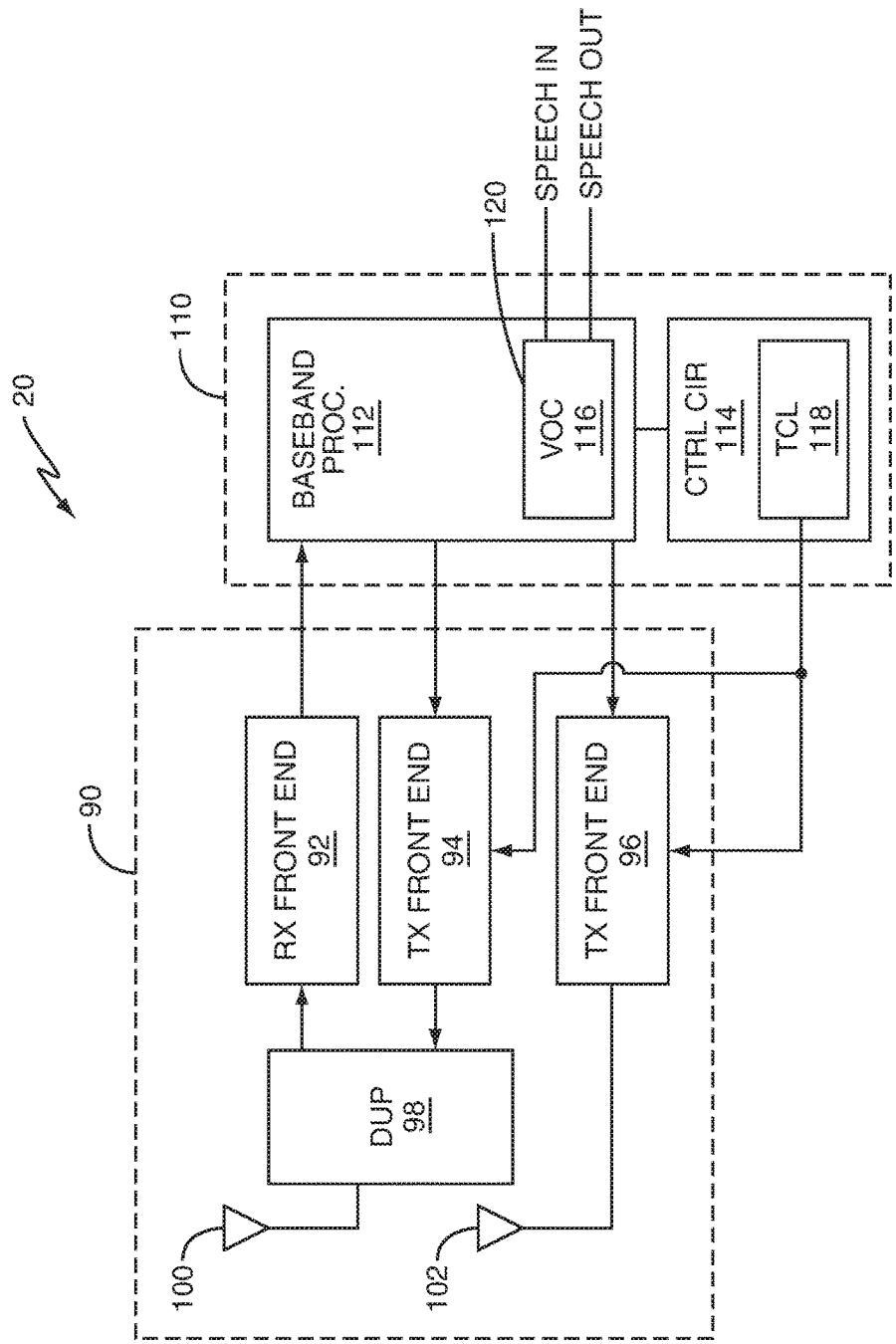
FIG. 5 illustrates an exemplary mobile terminal according to the present invention.

FIG. 5 illustrates some of the component parts of mobile terminal 20 configured according to one exemplary embodiment of the present invention. The mobile terminal 20 comprises a radio frequency section 90 and a digital section 110. The radio frequency section 90 comprises a receiver front end circuit 92, a first transmitter front end circuit 94, a second transmitter front end circuit 96, and a duplexer 98 that couples both the first transmitter front end circuit 94 and the receiver front end circuit 92 to a shared antenna 100. The second transmitter front end circuit 96 connects to an antenna 102.

The first and second transmitter front end circuits 94, 96 upconvert, filter, and amplify signals output by the digital section 110 for transmission via antenna 100 and/or antenna 102. Particularly, the first transmitter front end circuit 94 transmits the signals over the uplink when the mobile terminal 20 operates in the non-diversity mode. In the diversity mode, both the first and second front end circuits 94, 96 are used to transmit signals over the uplink channel. Respective D-to-A converters (not shown) convert signals output to the first and second transmitter front end circuits 94, 96. Receiver front end circuit 64 downconverts the receive signals to baseband frequency, and then filters and amplifies the received signal. An A-to-D converter (not shown) converts the receive signal to digital form for processing in digital section 110.

The digital section 110 comprises a baseband processor 112 and control circuits 114. The baseband processor 112 and control circuits 114 may comprise one or more processors or processing circuits. The baseband processor 112 processes signals transmitted and received by the mobile terminal 20. For transmitted signals, the baseband processor 112 encodes, modulates, and spreads transmitted signals. On the receiver side, the baseband processor 112 despreads, demodulates, and decodes the received signal. The baseband processor 112 also implements a vocoder 116 to encode and decode speech signals.

The control circuits 114 control the overall operation of the mobile terminal 20, and include transmit diversity control logic (TCL) 118 for dynamically switching between the diversity and diversity modes as previously described. Particularly, the TCL 118 may cause the control circuit 114 to generate control signals to enable/disable the first and second transmitter front ends 94, 96. A first control signal may be used to enable/disable the first transmitter front end circuit 94 and a second control signal may be used to enable/disable the second transmitter front end circuit 96. Other control signals may be generated to adjust the power of one or both of the first and second transmitter front end circuits 94, 96 to maintain a desired target error rate as previously described. The control circuit 114 may generate the control signals based on the total output power of the first and second transmitter front ends 94, 96, and/or based on a difference in output power levels between the first and second transmitter front ends 94, 96 as previously described.

The present invention provides a method and apparatus for substantially reducing power consumption in a WCDMA terminal, but may be applied to other communication terminals. When applied to a mobile terminal, the present invention results in longer battery life and talk times, and may also beneficially reduce overall interference in the network.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing power consumption in a code division multiple access terminal having first and second transmitters, the method comprising:
    calculating a total output power level for first and second transmitters;
    computing a difference between the output power levels of the first and second transmitters if the total output power level exceeds a predetermined power level, wherein computing the difference between the output power levels of the first and second transmitters comprises subtracting the output power level of one of the first and second transmitters from the output power level of the other of the first and second transmitters;
    enabling both the first and second transmitters if the total output power level exceeds the predetermined power level and the computed difference falls below a predetermined value; and
    disabling one of the first and second transmitters if the total output power level falls below the predetermined power level or the computed difference exceeds the predetermined value.

2. The method of claim 1 further comprising adjusting the total output power to maintain a desired target error rate.

3. The method of claim 1 wherein disabling one of the first and second transmitters comprises disabling the transmitter with the least favorable channel conditions.

4. The method of claim 1 wherein disabling one of the first and second transmitters comprises disabling the transmitter with the lowest output power.

5. A code division multiple access terminal comprising:
    first and second transmitters configured to transmit signals; and
    a control circuit configured to:
        calculate a total output power level for the first and second transmitters; and
        compute a difference between the output power levels of the first and second transmitters if the total output power level exceeds a predetermined power level, wherein to compute the difference between the output power levels of the first and second transmitters, the control circuit is configured to subtract the output power level of one of the first and second transmitters from the output power level of the other of the first and second transmitters;
    enable both the first and second transmitters if the total output power level exceeds the predetermined power level and the computed difference falls below a predetermined value; and
    disable one of the first and second transmitters if the total output power level falls below the predetermined power level or the computed difference exceeds the predetermined value.

6. The terminal of claim 5 wherein the control circuit is further configured to adjust the total output power to maintain a desired target error rate.

7. The terminal of claim 5 wherein the control circuit is configured to selectively disable the transmitter with the least favorable channel conditions.

8. The terminal of claim 5 wherein the control circuit is configured to selectively disable the transmitter with the lowest output power.

* * * * *